(12) United States Patent  (10) Patent No.: US 11,736,245 B2
Lin et al.  (45) Date of Patent: Aug. 22, 2023

(54) ENHANCED SPATIAL REUSE IN A WIRELESS LOCAL AREA NETWORK

(71) Applicant: MediaTek Inc., Hsinchu (TW)

(72) Inventors: Ray-Kuo Lin, Hsinchu (TW); Tsungjung Lee, Hsinchu (TW); Fu-yu Tsai, Hsinchu (TW); Wei-Chen Wang, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 608 days.

(21) Appl. No.: 16/726,993

(22) Filed: Dec. 26, 2019

(65) Prior Publication Data

US 2020/0220674 A1    Jul. 9, 2020

Related U.S. Application Data

(60) Provisional application No. 62/788,180, filed on Jan. 4, 2019.

(51) Int. Cl.
    *H04B 17/318*    (2015.01)
    *H04L 5/00*       (2006.01)
    *H04W 76/11*     (2018.01)
    *H04W 80/02*     (2009.01)
        (Continued)

(52) U.S. Cl.
    CPC ......... *H04L 5/0044* (2013.01); *H04B 17/318* (2015.01); *H04W 76/11* (2018.02); *H04W 80/02* (2013.01); *H04W 80/08* (2013.01); *H04W 84/12* (2013.01)

(58) Field of Classification Search
    CPC ..... H04B 17/318; H04L 5/0044; H04L 5/006; H04L 69/22; H04L 69/321; H04L 69/323; H04W 72/046; H04W 72/085; H04W 76/11; H04W 80/02; H04W 80/08; H04W 84/12
    See application file for complete search history.

(56) References Cited

U.S. PATENT DOCUMENTS

2017/0006661 A1    1/2017  Huang et al.
2017/0099219 A1*   4/2017  Lee ................... H04W 28/02
2017/0142659 A1    5/2017  Noh et al.
          (Continued)

FOREIGN PATENT DOCUMENTS

WO    WO-2016097688 A1 *  6/2016   ............ H04L 1/0011
WO       2018059593 A1    4/2018

*Primary Examiner* — Melvin C Marcelo
*Assistant Examiner* — Natali Pascual Peguero
(74) *Attorney, Agent, or Firm* — Tong J. Lee (57)  ABSTRACT

A wireless device performs spatial reuse in a wireless local area network. When receiving a packet, the wireless device measures a received signal quality from a first portion of the packet, and determines a required signal quality for correctly decoding a payload of the packet based on information in a packet header. The wireless device compares the received signal quality with the required signal quality. If the received signal quality is lower than the required signal quality, the wireless device transmits a signal that overlaps in time and in frequency with a second portion of the packet. Alternatively, a wireless device may identify a Basic Service Set Identification (BSSID) of a received packet. If the BSSID indicates that the packet is an inter-BSS packet, the wireless device transmits a signal overlapping in time and in frequency with the packet before reception of a frame check sequence (FCS) in the packet.

20 Claims, 4 Drawing Sheets

(51) Int. Cl.
*H04W 80/08* (2009.01)
*H04W 84/12* (2009.01)

(56) References Cited

U.S. PATENT DOCUMENTS

| | | | |
|---|---|---|---|
| 2017/0367129 A1* | 12/2017 | Yang | ............... H04L 43/10 |
| 2018/0139635 A1 | 5/2018 | Oteri et al. | |
| 2018/0227952 A1 | 8/2018 | Kim et al. | |
| 2020/0178120 A1* | 6/2020 | Sugaya | ............... H04W 28/06 |

* cited by examiner

ENHANCED SPATIAL REUSE IN A WIRELESS LOCAL AREA NETWORK

CROSS-REFERENCE TO RELATED APPLICATIONS

This application claims the benefit of U.S. Provisional Application No. 62/788,180 filed on Jan. 4, 2019, the entirety of which is incorporated by reference herein.

TECHNICAL FIELD

Embodiments of the invention relate to wireless communications; more specifically, to spatial reuse in a wireless communication network.

BACKGROUND

The efficient use of time and frequency resources in wireless local-area networks (WLANs) provide optimized bandwidth and response time to their users. The growing density of wireless devices and the limited spectrum available for wireless usage have a negative impact on the performance of WLANs.

One way to increase the efficiency of a WLAN is spatial reuse, where wireless devices simultaneously transmit signals by reusing frequencies in the same network area. However, due to the popularity of WLANs, it is increasingly common for multiple WLANs to co-exist in the same geographical area with overlapping signal coverages. Enhancement to spatial reuse can significantly improve the re-utilization of the wireless medium.

SUMMARY

In one embodiment, an apparatus is provided for operating in a WLAN. The apparatus comprises an antenna, a transceiver, a memory that stores instructions, and a processing circuit coupled to the memory. The processing circuit is operable to execute the instructions to: measure a received signal quality from a first portion of a packet, determine a required signal quality for correctly decoding a payload of the packet based on information in a header of the packet, compare the received signal quality with the required signal quality, and, in response to a determination that the received signal quality is lower than the required signal quality, cause the transceiver to transmit a signal that overlaps in time and in frequency with a second portion of the packet which is after the first portion.

In another embodiment, a method is provided for operating in a WLAN. The method comprises: measuring a received signal quality from a first portion of a packet; determining a required signal quality for correctly decoding a payload of the packet based on information in a header of the packet; and comparing the received signal quality with the required signal quality. In response to a determination that the received signal quality is lower than the required signal quality, the method further comprises transmitting a signal that overlaps in time and in frequency with a second portion of the packet which is after the first portion.

In yet another embodiment, an apparatus is provided for operating in a WLAN. The apparatus comprises an antenna, a transceiver, a memory that stores instructions, and a processing circuit coupled to the memory. The processing circuit is operable to execute the instructions to: identify a Basic Service Set (BSS) Identification (BSSID) of a packet based on information in a Medium Access Control (MAC) header of the packet; and, in response to a determination from the BSSID that the packet is an inter-BSS packet, cause the transceiver to transmit a signal overlapping in time and in frequency with the packet before reception of a frame check sequence (FCS) in the packet.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the present invention enhance the efficiency of spatial reuse in a wireless communication network, such as a wireless local area network (WLAN). In one embodiment, the determination on spatial reuse is based on the signal quality of a received packet. In another embodiment, the determination on spatial reuse is based on the source of a received packet. In both embodiments, a wireless device may begin spatial reuse before the wireless device receives the packet payload.

Figure 1:
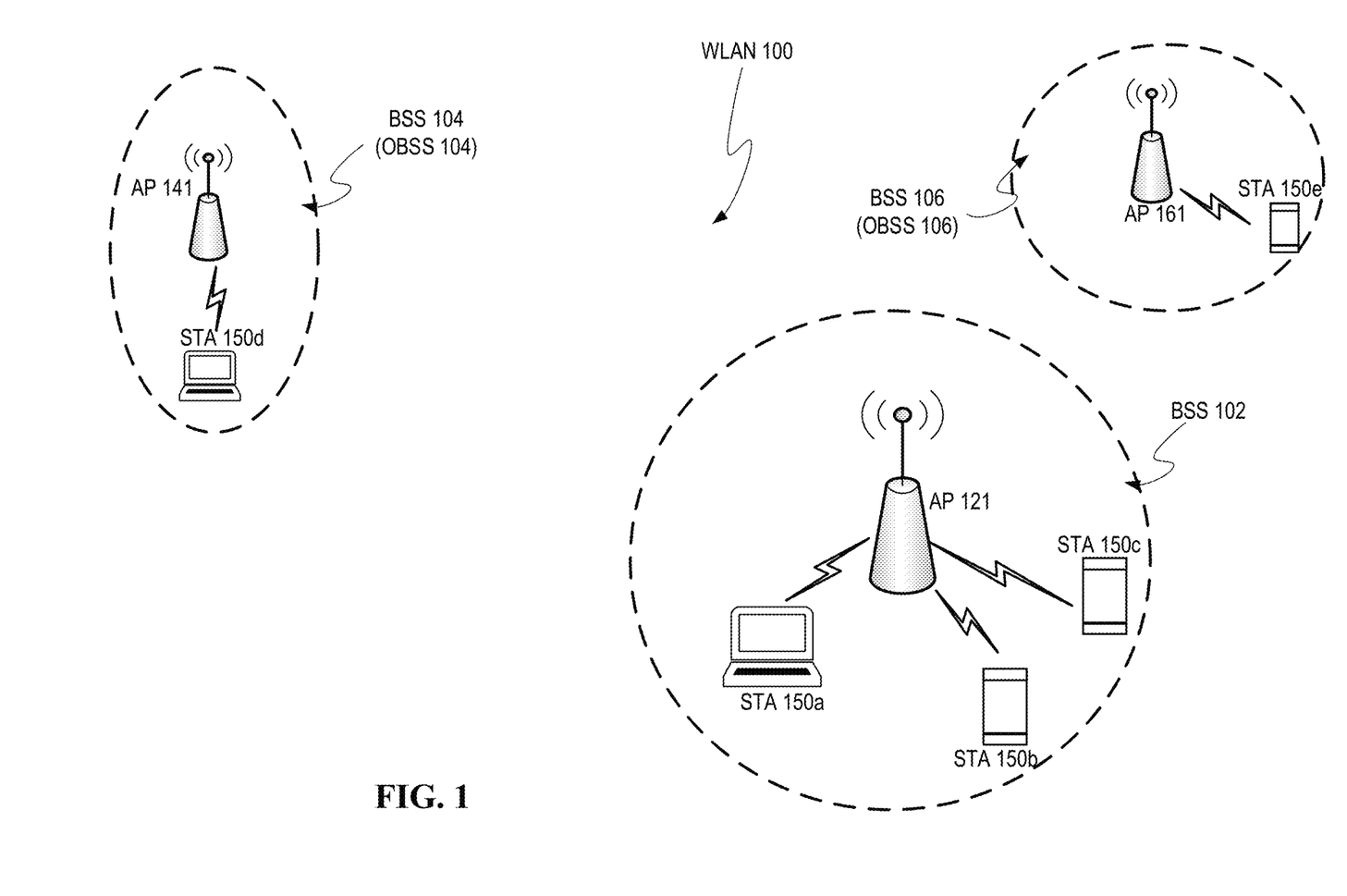
FIG. 1 is a diagram illustrating a WLAN in which the embodiments of the present invention may be practiced.

FIG. 1 is a diagram illustrating a WLAN 100 according to one embodiment. WLAN 100 includes a number of Basic Service Sets (BSSs); e.g., BSS 102, BSS 104 and BSS 106. Each BSS may include one or more access points (APs) and one or more stations (STAs). Each of the APs and STAs in FIG. 1 may be a high-throughput (HT) device, a very high-throughput (VHT) device, a high-efficiency (HE)

device, a non-HT device, or a legacy device. The STAs and APs may communicate in accordance with IEEE 802.11 communication standards, including IEEE 802.11ax, IEEE 802.11 a/g/n/ac, extensions or amendments to IEEE 802.11, and other wireless communications standards or protocols. For example, BSS 102 includes an AP 121 and STAs 150*a*, 150*b* and 150*c*; BSS 104 includes an AP 141 and an STA 150*d*; and BSS 106 includes an AP 161 and an STA 150*e*. For simplicity, the STAs in FIG. 1 are collectively referred to as STAs 150.

In one embodiment, STAs 150 may be mobile devices that do not have fixed locations. In one embodiment, STAs 150 may be user devices including, but not limited to, cellular phones, smartphones, handheld wireless devices, wireless wearable devices, tablets, laptops, Internet of Things (IoT) devices, or other devices that may be transmitting and receiving using the IEEE 802.11 protocol such as IEEE 802.11ax or another wireless protocol.

To BSS 102, BSSs 104 and 106 are overlapping BSSs (OBSSs), as their wireless coverage may overlap with that of BSS 102. Thus, BSSs 104 and 106 are hereinafter referred to as OBSS 104 and OBSS 106, respectively. A packet (also referred to as a frame) sent and received within BSS 102 is called an intra-BSS packet; a packet sent from either OBSS 104 or OBSS 106 and received by BSS 102 is called an inter-BSS packet. Thus, an intra-BSS packet may be distinguished from an inter-BSS packet based on the source (i.e., the sender) of the packet.

In one embodiment, AP 121 is configured to determine whether or not to transmit a signal with spatial reuse based on the signal quality of a received packet, in view of the required data rate to correctly decode the packet data. The received packet may be an inter-BSS packet or an intra-BSS packet. The received signal quality may be measured by the received signal strength indicator (RSSI), which is a measurement indicating the power level in a received radio frequency (RF) signal. Alternatively, the received signal quality may be measured by the Signal-to-Noise ratio (SNR) or other metrics.

In another embodiment, AP 121 is configured to determine whether or not to transmit a signal with spatial reuse based on whether a received packet is an inter-BSS packet or an intra-BSS packet. Once AP 121 determines that the packet is an inter-BSS packet, AP 121 can immediately start spatial reuse before the Frame Check Sequence (FCS) at the tail end of the packet.

In both embodiments, when AP 121 determines to perform spatial reuse, the signal transmitted by the AP 121 can overlap in time and in frequency with the received packet. As the AP's determination can be made based on a header portion of the received packet, the spatial reuse can begin concurrently or before the start of the packet payload. This "early start" of the spatial reuse period allows more time for AP 121 to re-utilize the time-and-frequency resources allocated to the received packet, and, therefore, improves the efficiency of spatial reuse in WLANs.

Figure 2A:
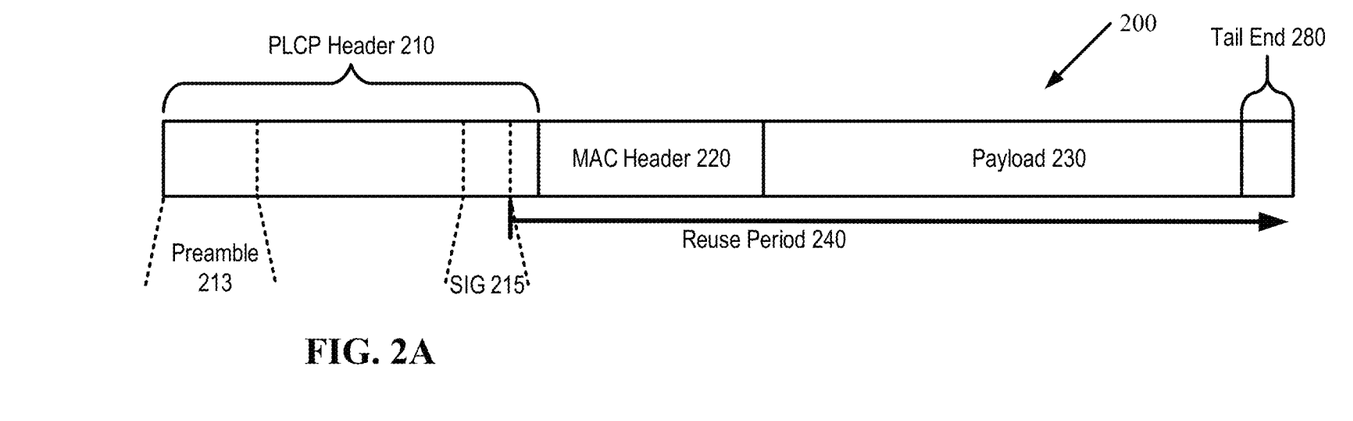
FIG. 2A is a schematic diagram illustrating a packet format according to one embodiment.

FIG. 2A is a diagram illustrating a format of a packet 200 received by a wireless device; e.g., AP 121 of FIG. 1, according to one embodiment. Packet 200 is also known as a Physical Layer Convergence Procedure (PLCP) Protocol Data Unit (PPDU). Packet 200 includes a physical layer header; e.g., a PLCP header 210, a Medium Access Control (MAC) header 220, a payload 230 for carrying packet data, and a tail end 280. PLCP header 210 further includes a SIG field 215 for carrying signaling information, such as the information about the Modulation and Coding Scheme (MCS) used to encode payload 230. AP 121 may receive packet 200 in a frequency channel (Fc). AP 121 monitors received packets in frequency channel Fc to detect opportunities for spatial reuse of Fc.

In one embodiment, during the process of receiving packet 200, AP 121 measures the received signal quality from the PLCP header 210 or a portion thereof. For example, AP 121 may measure the received signal quality in a preamble portion 213 of PLCP header 210. Alternatively, AP 121 may measure the received signal quality from any portion of packet 200 not limited to PLCP header 210. The received signal quality measurement may be an RSSI measurement, an SNR measurement, or a measurement of other metrics.

After AP 121 measures the received signal quality, AP 121 compares the received signal quality with the required signal quality for correctly decoding payload 230. The required signal quality for correctly decoding payload 230 is typically higher than the required signal quality for correctly decoding PLCP header 210; e.g., due to the difference in the required data rate. AP 121 may determine the required signal quality for correctly decoding payload 230 based on the MCS in SIG field 215. AP 121 may be configured to store information that associates different MCSs with corresponding data rates and corresponding levels of required signal quality. If the received signal quality is lower than the required signal quality, AP 121 can start transmission with spatial reuse; that is, AP 121 can transmit a packet using the same frequency channel Fc as packet 200 in a time period overlapping with the transmission of packet 200.

FIG. 2A shows that AP 121 can start spatial reuse after the aforementioned measurement and comparison of signal quality. For example, if the received signal quality is measured based on received preamble 213, spatial reuse may start after SIG field 215 is received and processed by AP 121. More specifically, the spatial reuse may start at any time instant in a reuse period 240 which spans from the end of the header portion specifying the MCS to the end of packet 200; e.g., spatial reuse may start immediately after SIG field 215. Thus, AP 121 may start spatial reuse before MAC header 220 is received and processed. As MAC header 220 contains an indication of the source BSS from which packet 200 was sent, according to this embodiment, AP 121 may start spatial reuse without identifying the source BSS. Alternatively, if the received signal quality is measured using at least a portion of packet 200 after SIG field 215, AP 121 may start spatial reuse at any time instant after the received signal quality is measured and compared without the AP identifying the source BSS.

Referring to the example in FIG. 1, if the received signal quality of a packet from OBSS 104 is too poor (below a predetermined threshold) for AP 121 to correctly decode its payload, AP 121 can start spatial reuse without identifying the source of the packet as OBSS 104 (i.e., without identifying the packet as an inter-BSS packet). Thus, AP 121 can determine to start spatial reuse even if the MAC header of the packet cannot be decoded due to poor signal quality.

Figure 3:
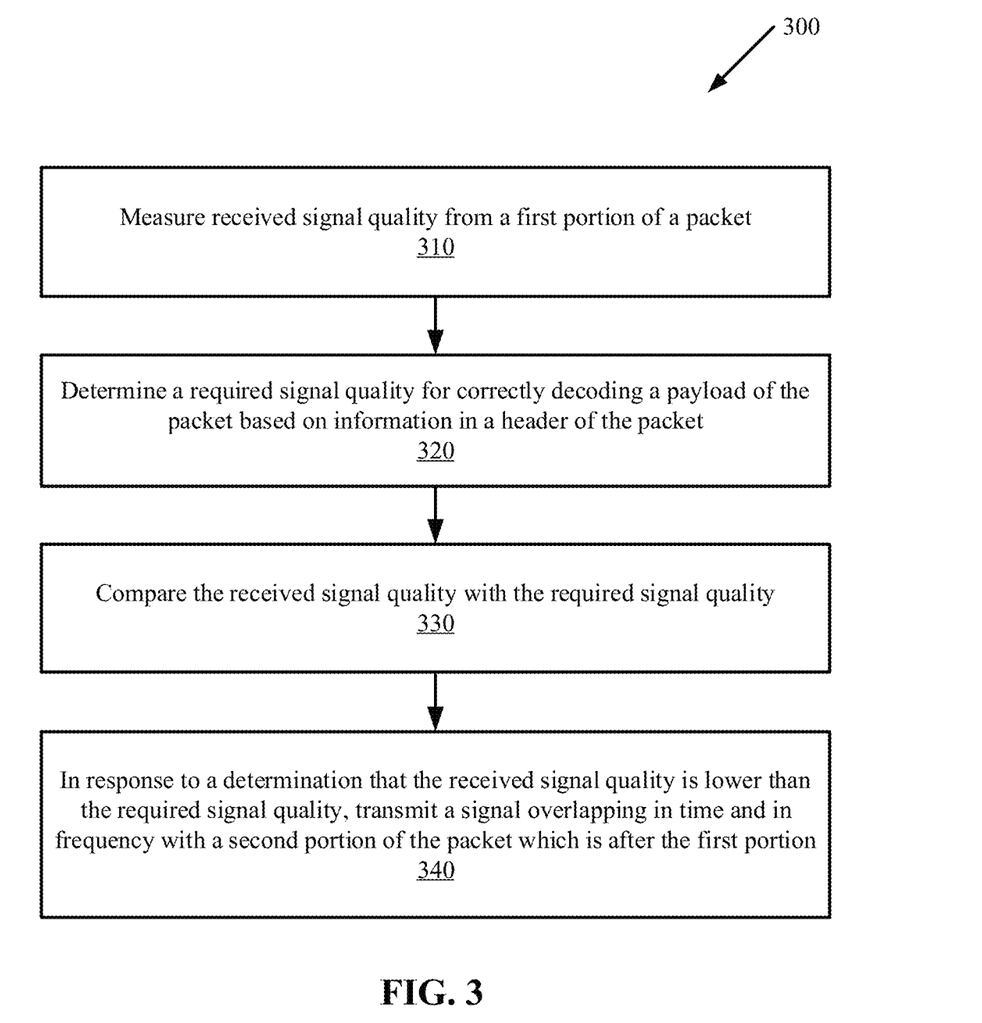
FIG. 3 illustrates a method for spatial reuse in a WLAN according to one embodiment.

FIG. 3 illustrates a method 300 performed by a wireless device in a WLAN according to one embodiment. An example of the WALN may be the WLAN 100 of FIG. 1. The method 300 starts at step 310 when the wireless device measures received signal quality from a first portion of a packet. The wireless device at step 320 determines a required signal quality for correctly decoding a payload of the packet based on information in a header of the packet. In one embodiment, the header of the packet may be a PLCP header. In one embodiment, the wireless device determines the required signal quality for correctly decoding the payload with a data rate, where the data rate is corresponding to an MCS specified in the header. The wireless device at step 330 compares the received signal quality with the required signal quality. If the received signal quality is lower than the required signal quality, the wireless device at step 340 transmits a signal overlapping in time and in frequency with a second portion of the packet which is after the first portion. In one embodiment, the wireless device may transmit the signal to another wireless device such as an AP or STA. In one embodiment, the wireless device is an AP, e.g., AP 121, 141 or 161 in FIG. 1. In one embodiment, the wireless device transmits the signal immediately after the reception of the information regarding the MCS.

Figure 2B:
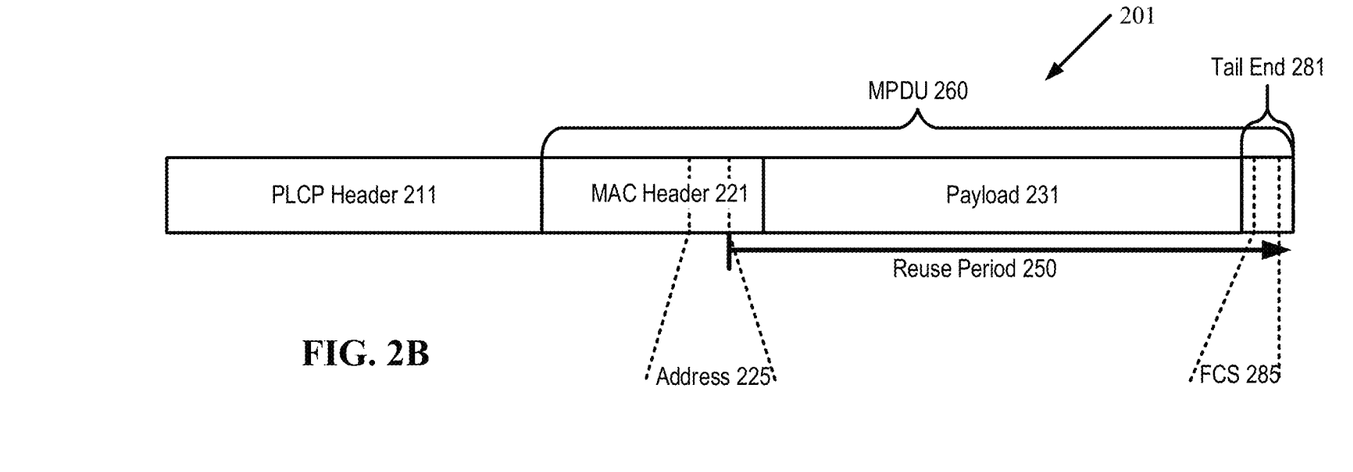
FIG. 2B is a schematic diagram illustrating a packet format according to another embodiment.

FIG. 2B is a diagram illustrating a format of a packet 201 received by a wireless device; e.g., AP 121 of FIG. 1, according to another embodiment. Packet 201 is also known as a PPDU. Packet 201 includes a physical layer header; e.g., a PLCP header 211, a MAC header 221, a payload 231 for carrying packet data, and a tail end 281. Packet 201 may have the same content as packet 200 of FIG. 2A; however, a number of fields not shown in FIG. 2A are now shown in FIG. 2B to illustrate another embodiment of spatial reuse. MAC header 221 includes an address field 225, which may further include a BSS Identification (BSSID) field. The BSSID field contains a BSSID identifying the BSS from which the packet is transmitted. In some packets where there is no BSSID field (e.g., a Request to Send (RTS) packet), address field 225 may include a receiver address (RA) field and a transmitter address (TA) field instead of a BSSID field. MAC header 221, payload 231, and tail end 281 together form a MAC Protocol Data Unit (MPDU) 260. Packet 201 contains an MPDU 260. In one embodiment, packet 201 contains a single MPDU. In alternative embodiments, packet 201 may contain more than one MPDU. Tail end 281 includes a Frame Check Sequence (FCS) 285 which contains the result of applying an error correction code (e.g., CRC-32) to MAC header 221 and payload 231.

AP 121 may receive packet 201 in a frequency channel (Fc). AP 121 monitors received packets in frequency channel Fc to detect opportunities for spatial reuse of Fc. In one embodiment, AP 121 inspects MAC header 221 of packet 201 to identify the BSSID or other indication of the source BSS from which packet 201 is transmitted. Referring back to FIG. 1, if address field 225 of MAC header 221 contains a BSSID which does not match the BSSID of BSS 102 (i.e., the BSS of the receiving AP 121), then AP 121 identifies packet 201 as an inter-BSS packet. If address field 225 of MAC header 221 contains a BSSID which matches the BSSID of BSS 102, then AP 121 identifies packet 201 as an intra-BSS packet. This BSSID may be detected from the BSSID field (if exists), or either the TA or RA field in address field 225. FIG. 2B shows that AP 121 can start spatial reuse after the BSSID is identified as inter-BSS, without waiting for the reception of FCS 285. More specifically, the spatial reuse may start at any time instant in a reuse period 250 which spans from the end of the field identifying the BSSID to the end of packet 201; e.g., AP 121 can start spatial reuse as soon as the BSSID is identified as inter-BSS.

Figure 4:
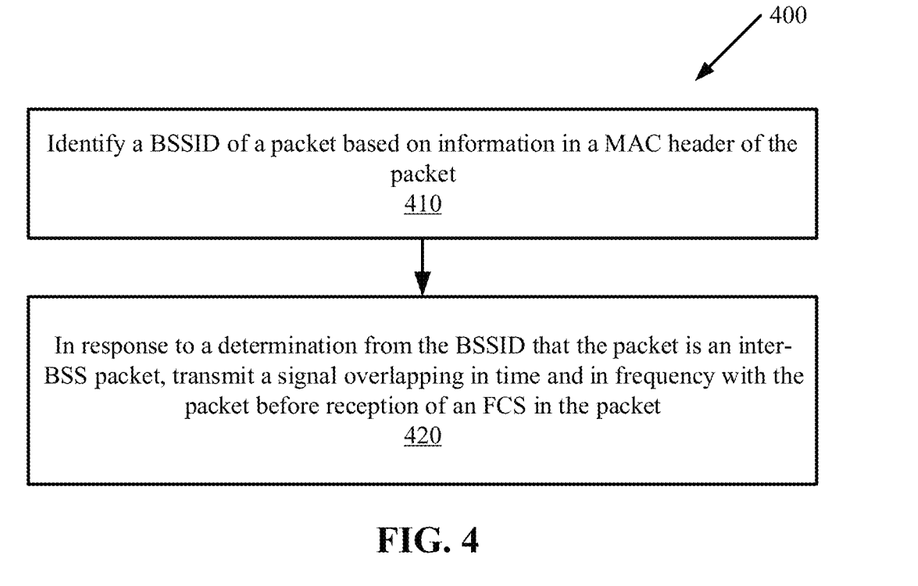
FIG. 4 illustrates a method for spatial reuse in a WLAN according to another embodiment.

FIG. 4 illustrates a method 400 performed by a wireless device in a WLAN according to one embodiment. An example of the WALN may be the WLAN 100 of FIG. 1. The method 400 starts at step 410 when the wireless device identifies a BSSID of a packet based on information in a header of the packet. If the BSSID indicates that the packet is an inter-BSS packet, the wireless device at step 420 transmits a signal overlapping in time and in frequency with the packet before the reception of an FCS in the packet.

In one embodiment, the wireless device is an AP, e.g., AP 121, 141 or 161 in FIG. 1. In one embodiment, the packet contains a single MPDU.

Figure 5:
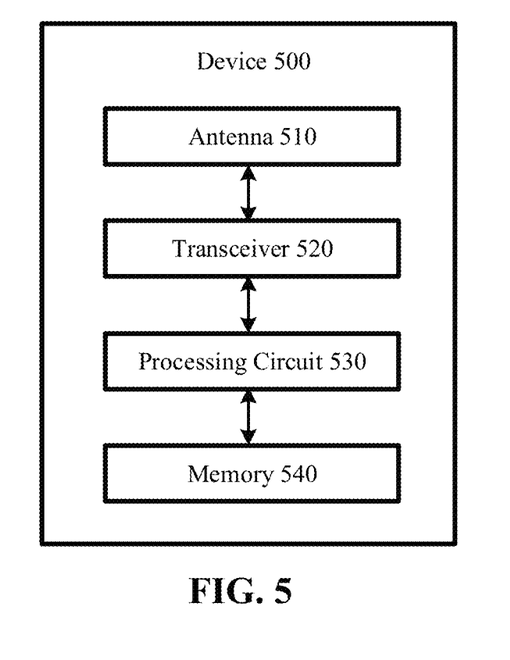
FIG. 5 is a block diagram illustrating elements of a wireless device operable in a WLAN according to one embodiment.

FIG. 5 is a schematic diagram illustrating functional elements of a wireless device 500 (also referred to as device 500) according to one embodiment. Device 500 may be any of the APs 121, 141, 161 or STAs 150 in FIG. 1. Device 500 may be configured to perform one or more of the functions and/or methods described herein.

Device 500 may include an antenna 510, a transceiver 520 including a transmitter and a receiver, a processing circuit 530, and a memory 540. Memory 540 may include computer-readable program code, which, when executed by processing circuit 530, causes the processing circuit to perform operations according to embodiments disclosed herein, such as method 300 in FIG. 3 and method 400 in FIG. 4. Non-limiting examples of memory 540 include: a computer-readable memory or storage device, random access memory (RAM), dynamic RAM (DRAM), synchronous DRAM (SDRAM), read-only memory (ROM), and/or other storage devices and media.

In one embodiment, processing circuit 530 may include one or more processors or processor cores, which may be general-purpose, special-purpose, or a combination of both. In another embodiment, processing circuit 530 may include a controller, a logic circuit, or the like. In one embodiment, processing circuit 530 may include circuitry such as digital signal processors (DSPs), graphics processing units (GPUs), and/or other hardware circuitry.

Antenna 510 may be used in wireless communications such as WLAN, multi-input multi-output (MIMO) communications, Bluetooth®, etc. Antenna 510 is compatible for use with the IEEE 802.11 family of standards. Antenna 510 may be communicatively coupled to transceiver 520 to transmit and/or receive RF signals. Transceiver 520 may transmit and/or receive RF signals in frequency bands allocated for WLAN transmissions according to IEEE 802.11 standards, extensions or amendments to the IEEE 802.11 standards, or other standards or proposed specifications for WLANs. In one embodiment, device 500 may include multiple antennas.

In some embodiments, device 500 may be configured to communicate in accordance with one or more specific communication standards, such as the IEEE 802.11 standards, extensions or amendments to the IEEE 802.11 standards, or other standards or proposed specifications for WLANs, although the scope of the invention is not limited in this respect.

In some embodiments, device 500 may be part of a portable wireless communication device, such as a laptop or portable computer with wireless communication capability, a tablet, a wireless phone, a smartphone, a wireless headset, a pager, a gaming device, an infotainment device, an instant messaging device, a digital camera, an IoT device, a television, a medical device, an access point (AP), a base station, or another device that may receive and/or transmit information wirelessly. In some embodiments, device 500 may further include one or more user interface elements, such as a keyboard, a display, touch sensors, speakers, etc.

Although device 500 is illustrated as having several separate functional blocks, one or more of the functional blocks may be combined and may be implemented by combinations of software and/or hardware configured elements. Moreover, device 500 may include additional or alternative functional blocks implemented by combinations of software and/or hardware configured elements.

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

Moreover, all the flow diagrams disclosed herein have been discussed in relation to a set of exemplary steps. While these flow diagrams show a particular order of operations performed by certain embodiments of the invention, it should be understood that such order is exemplary (e.g., alternative embodiments may perform the operations in a different order, combine certain operations, overlap certain operations, etc.).

While the techniques discussed herein have been specifically discussed in relation to IEEE 802.11 systems, it should be appreciated that the techniques discussed herein can generally be applicable to any type of wireless communication standard, protocol, and/or equipment.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. An apparatus operating in a wireless local area network (WLAN), comprising:
    an antenna;
    a transceiver;
    a memory that stores instructions; and
    a processing circuit coupled to the memory, the processing circuit operable to execute the instructions to:
        measure a received signal quality from a first portion of a packet transmitted from a source;
        receive a header of the packet indicating a Modulation and Coding Scheme (MCS) used to encode a payload of the packet;
        determine, based on the MCS, a required signal quality for correctly decoding the payload;
        compare the received signal quality with the required signal quality; and
        in response to a determination that the received signal quality is lower than the required signal quality, cause the transceiver to transmit a signal that overlaps in time and in frequency with a second portion of the packet, wherein the second portion starts before a Medium Access Control (MAC) header that indicates whether the packet is inter-BSS or intra-BSS.

2. The apparatus of claim 1, wherein the header is a Physical Layer Convergence Procedure (PLCP) header.

3. The apparatus of claim 1, wherein the processing circuit is operable to: determine the required signal quality for correctly decoding a payload with a data rate corresponding to the MCS specified in the header.

4. The apparatus of claim 3, wherein the processing circuit is operable to cause the transceiver to transmit the signal at a time instant in a reuse period which spans from an end of a header portion specifying the MCS to an end of the packet.

5. The apparatus of claim 1, wherein the processing circuit is operable to cause the transceiver to transmit the signal without first identifying a Basic Service Set (BSS) of the source.

6. The apparatus of claim 1, wherein the processing circuit is operable to measure a Received Signal Strength Indicator (RSSI) as the received signal quality.

7. A method for operating in a wireless local area network (WLAN), comprising:
    measuring a received signal quality from a first portion of a packet transmitted from a source;
    receiving a header of the packet indicating a Modulation and Coding Scheme (MCS) used to encode a payload of the packet;
    determining, based on the MCS, a required signal quality for correctly decoding a payload of the packet;
    comparing the received signal quality with the required signal quality; and
    in response to a determination that the received signal quality is lower than the required signal quality, transmitting a signal that overlaps in time and in frequency with a second portion of the packet, wherein the second portion starts before a Medium Access Control (MAC) header that indicates whether the packet is inter-BSS or intra-BSS.

8. The method of claim 7, wherein the header is a Physical Layer Convergence Procedure (PLCP) header.

9. The method of claim 7, wherein determining the required signal quality for correctly decoding a payload with a data rate corresponding to the MCS specified in the header.

10. The method of claim 9, further comprising:
    transmitting the signal at a time instant in a reuse period which spans from an end of a header portion specifying the MCS to an end of the packet.

11. The method of claim 7, further comprising:
    transmitting the signal without identifying a Basic Service Set (BSS) of the source.

12. The method of claim 7, wherein measuring the received signal quality further comprises: measuring a Received Signal Strength Indicator (RSSI).

13. An apparatus operating in a wireless local area network (WLAN), comprising:
    an antenna;
    a transceiver;
    a memory that stores instructions; and
    a processing circuit coupled to the memory, the processing circuit operable to execute the instructions to:
        identify a Basic Service Set (BSS) Identification (BSSID) of a packet based on information in a Medium Access Control (MAC) header of the packet; and
        in response to a determination that the BSSID of the packet does not match the BSSID corresponding to the apparatus and therefore the packet is an inter-BSS packet, cause the transceiver to immediately start transmitting a signal overlapping in time and in frequency with the packet before reception of a frame check sequence (FCS) in the packet regardless of signal quality of the packet.

14. The apparatus of claim 13, wherein the packet includes a single MAC Protocol Data Unit (MPDU) having the FCS at a tail end of the packet.

15. The apparatus of claim 13, wherein the processing circuit is operable to cause the transceiver to transmit the signal when the BSSID in the MAC header fails to match an identification of a BSS in which the packet is received.

16. The apparatus of claim 13, wherein the BSSID is identified from at least one of: a BSSID field, a transmitter address (TA) field and a receiver address (RA) field in the header.

17. A method performed by an apparatus for operating in a wireless local area network (WLAN), comprising:
- identifying a Basic Service Set (BSS) Identification (BSSID) of a packet based on information in a Medium Access Control (MAC) header of the packet; and
- in response to a determination that the BSSID of the packet does not match the BSSID corresponding to the apparatus and therefore the packet is an inter-BSS packet, immediately starting to transmit a signal overlapping in time and in frequency with the packet before reception of a frame check sequence (FCS) in the packet regardless of signal quality of the packet.

18. The method of claim 17, wherein the packet includes a single MAC Protocol Data Unit (MPDU) having the FCS at a tail end of the packet.

19. The method of claim 17, further comprising:
- transmitting the signal when the BSSID in the header fails to match an identification of a BSS in which the packet is received.

20. The method of claim 17, wherein the BSSID is identified from at least one of: a BSSID field, a transmitter address (TA) field and a receiver address (RA) field in the header.

* * * * *